(No Model.)

C. LELAND.
ANIMAL TRAP.

No. 571,773.  Patented Nov. 24, 1896.

Witnesses
E. G. McKee
L. W. Graves.

Inventor
Charles Leland
By John Wedderburn
Attorney

UNITED STATES PATENT OFFICE.

CHARLES LELAND, OF MOUNT DESERT, MAINE.

ANIMAL-TRAP.

SPECIFICATION forming part of Letters Patent No. 571,773, dated November 24, 1896.

Application filed July 15, 1896. Serial No. 599,208. (No model.)

*To all whom it may concern:*

Be it known that I, CHARLES LELAND, a citizen of the United States, residing at Mount Desert, in the county of Hancock and State of Maine, have invented certain new and useful Improvements in Mouse or Rat Traps; and I do hereby declare the following to be a full, clear, and exact description of the invention, such as will enable others skilled in the art to which it appertains to make and use the same.

My invention relates to mouse or rat traps of the class where the animal is caught by a bar actuated by a spring, and has for its object to provide a cheap and effective trap.

My invention consists of a base provided with one or more springs each adapted to be held by a suitable release-trigger sprung by the movement of a bait-fork and separated from each other by suitable partitions. I further provide partitions to prevent the bait from being touched from the rear, all as hereinafter described.

In both views like figures of reference indicate the same parts.

Figure 1:
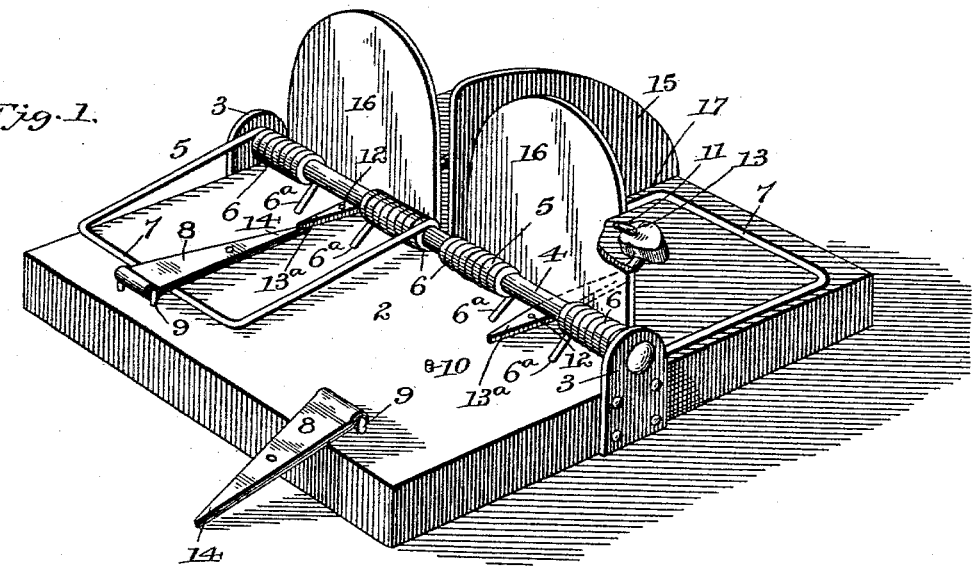
Figure 2:
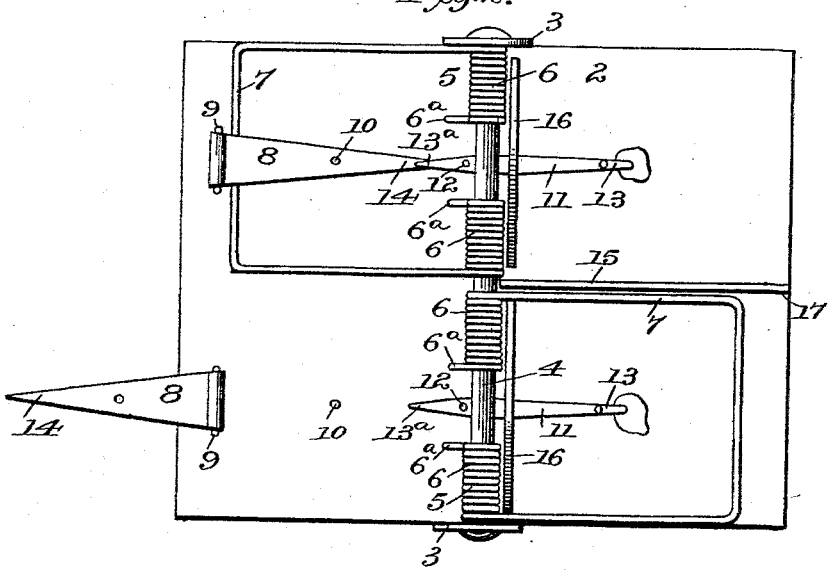

Figure 1 is a perspective rear view of my trap, one spring set, the other released. Fig. 2 is a plan of the same.

2 is the base, which is preferably of wood. At the sides of the base 2 are attached the lugs 3, through which passes the rod 4, being held by having the ends riveted, as shown. On this rod are located the springs 5, consisting of the coils 6, with ends $6^a$ held on the base, wound in opposite directions, and having their outer ends connected by the U-shaped deadfall-wires 7.

8 is a trigger swinging on the staple 9 and provided with a hole to fit over the pin 10, thereby preventing lateral displacement.

11 is a bait-hook pivoted at 12 to rotate in a horizontal plane and provided at one end with a hook 13 to hold the bait, the other, $13^a$, being prolonged sufficiently to slip over the pointed end 14 of the trigger 8 when in a central position.

15 is a partition to separate the different springs from each other, and 16 are partitions to prevent the bait from being attacked from the rear of the trap.

The partition 15 is preferably held in a saw-slit 17, but may be fastened in any other suitable manner.

The operation of my trap is as follows: The hook being baited, the wire 7 is bent back, the trigger 8 being lifted up until it is in an approximately horizontal position, when the trigger 8 is forced down and the end $13^a$ of the hook 11 slipped over the top, thereby holding the spring from rotating. Upon the bait-hook being moved the trigger 8 is released, when the force of the spring throws it back, the spring itself forcibly and suddenly rotating on the rod 4, catching the animal between the U-shaped wires 7 and the base 2.

Having thus described my invention, I claim—

1. In an animal-trap, the combination with a suitable base, of a vertical partition mounted thereon, a spring-actuated deadfall, a hinged catch for holding said deadfall in its set position upon one side of said partition, and a pivoted trigger engaging said catch and adapted to receive the bait on the opposite side of the partition; the construction being such that the deadfall and catch are completely concealed behind the partition, substantially as described.

2. In an animal-trap, the combination with a suitable base carrying a lateral shaft, of a spring-actuated deadfall mounted upon said shaft, a hinged catch for holding said deadfall in its set position, and a horizontally-movable pivoted trigger adapted to engage the free end of the catch to hold it in its set position, substantially as described.

3. In an animal-trap, the combination with a suitable base, a vertical partition mounted on said base, a spring-actuated deadfall, a hinged catch for securing the same in its set position upon one side of said partition and provided with a vertical aperture, a vertical pin mounted in the base and adapted to engage said aperture to prevent any lateral movement of the catch, and a pivoted bait-trigger moving in a horizontal plane and adapted to receive the bait on the opposite side of said partition and adapted to engage said catch, substantially as described.

4. In an animal-trap, the combination with a suitable base, of apertured lugs mounted thereon, a shaft mounted in said lugs, a vertical partition forward of said shaft, a spring-actuated deadfall mounted upon said shaft, a hinged catch for retaining the deadfall in its set position upon one side of said partition, and a horizontally-movable bait-trigger engaging said catch and arranged upon the opposite side of said partition, substantially as described.

In testimony whereof I have signed this specification in the presence of two subscribing witnesses.

CHARLES LELAND.

Witnesses:
J. HARNOR,
T. E. DARKE.